US009838343B2

(12) United States Patent
Kallio et al.

(10) Patent No.: US 9,838,343 B2
(45) Date of Patent: Dec. 5, 2017

(54) METHOD, APPARATUS AND COMPUTER PROGRAM FOR CONTROL OF A TEXT COMPONENT OF A CALL

(71) Applicant: NOKIA SOLUTIONS AND NETWORKS OY, Espoo (FI)

(72) Inventors: Juha Matias Kallio, Vantaa (FI); Lauri Kalevi Lahtinen, Espoo (FI); Vesa Tapani Tiainen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/112,974

(22) PCT Filed: Jan. 22, 2014

(86) PCT No.: PCT/EP2014/051223
§ 371 (c)(1),
(2) Date: Jul. 20, 2016

(87) PCT Pub. No.: WO2015/110152
PCT Pub. Date: Jul. 30, 2015

(65) Prior Publication Data
US 2016/0337282 A1 Nov. 17, 2016

(51) Int. Cl.
*H04L 12/58* (2006.01)
*H04M 1/725* (2006.01)
(Continued)

(52) U.S. Cl.
CPC ............. *H04L 51/066* (2013.01); *H04W 4/12* (2013.01); *H04W 36/0022* (2013.01);
(Continued)

(58) Field of Classification Search
CPC ......... H04W 8/08; H04W 28/26; H04W 4/12; H04W 36/0027
(Continued)

(56) References Cited

U.S. PATENT DOCUMENTS 6,560,457 B1 * 5/2003 Silver ................... H04W 8/08
455/433
6,678,526 B1 * 1/2004 Sugirtharaj ........... H04W 28/26
370/351

(Continued)

OTHER PUBLICATIONS

International Search Report and Written Opinion dated Jun. 4, 2014, corresponding to International Patent Application No. PCT/EP2014/051223.

(Continued)

*Primary Examiner* — William D Cumming
(74) *Attorney, Agent, or Firm* — Squire Patton Boggs (US) LLP

(57) ABSTRACT

A method, apparatus, and computer program for control of a text component of a call. The method may include sending a message to a node for establishment of a call in an area, the area providing at least partially overlapping packet switched and circuit switched coverage. The message may include a request for one of a packet switched real-time text component and a circuit switched real-time text component in said call. In response to receiving a message from the node, the method may include sending a further message to the node including a request to provide the other of a packet switched real-time text component and a circuit switched real-time text component in the call.

14 Claims, 5 Drawing Sheets

(51) Int. Cl.
*H04W 4/00* (2009.01)
*H04W 4/12* (2009.01)
*H04W 36/00* (2009.01)
H04W 76/00 (2009.01)
H04W 84/04 (2009.01)

(52) U.S. Cl.
CPC ............ *H04L 51/38* (2013.01); *H04W 76/007* (2013.01); *H04W 84/042* (2013.01)

(58) Field of Classification Search
USPC ......... 455/412.1, 433; 370/351, 352; 379/52
See application file for complete search history.

(56) References Cited

U.S. PATENT DOCUMENTS

| | | | | | |
|---|---|---|---|---|---|
| 7,626,994 | B2* | 12/2009 | Bennett | ............... | H04L 12/5692 370/216 |
| 8,280,954 | B2* | 10/2012 | Curry | ................... | H04L 67/141 379/52 |
| 9,276,761 | B2* | 3/2016 | Scott | ................... | H04L 12/2898 |
| 9,565,262 | B2* | 2/2017 | Curry | ................... | H04L 67/141 |
| 2003/0118002 | A1* | 6/2003 | Bradd | ............... | H04L 29/12009 370/352 |
| 2006/0007916 | A1* | 1/2006 | Jones | ...................... | H04L 12/66 370/352 |
| 2007/0110035 | A1* | 5/2007 | Bennett | ............... | H04L 12/2898 370/352 |
| 2007/0189520 | A1* | 8/2007 | Altberg | .................. | G06Q 30/02 380/30 |
| 2011/0238734 | A1* | 9/2011 | Curry | ................... | H04L 67/141 709/203 |
| 2013/0171975 | A1* | 7/2013 | Lindner | ............... | H04L 65/1083 455/412.1 |
| 2013/0268605 | A1* | 10/2013 | Curry | ................... | H04L 67/141 709/206 |
| 2016/0337282 | A1 | 11/2016 | Kallio | ..................... | H04W 4/12 |
| 2016/0337908 | A1* | 11/2016 | Poikselka | ......... | H04W 36/0027 |
| 2017/0222958 | A1* | 8/2017 | Curry | ...................... | H04L 51/04 709/206 |

OTHER PUBLICATIONS

ETSI TS 123 226 V11.0.0 (Sep. 2012); Digital cellular telecommunications system (Phase 2+); Universal Mobile Telecommunications System (UMTS); LTE; Global text telephony (GTT); Stage 2 (3GPP TS 23.226 version 11.0.0 Release 11); 28 pages.
ETSI TS 129 163 V11.9.0 (Jan. 2014); Digital cellular telecommunications system (Phase 2+); Universal Mobile Telecommunications System (UMTS); LTE; Interworking between the IP Multimedia (IM) Core Network (CN) subsystem and Circuit Switched (CS) networks (3GPP TS 29.163 version 11.9.0 Release 11); 327 pages.
3GPP TS 22.101 V13.1.0 (Dec. 2013); 3rd Generation Partnership Project; Technical Specification Group Services and System Aspects; Service aspects; Service principles (Release 13); 84 pages.
3GPP TS 23.167 V11.9.0 (Dec. 2013); 3rd Generation Partnership Project; Technical Specification Group Services and System Aspects; IP Multimedia Subsystem (IMS) emergency sessions (Release 11); 42 pages.
3GPP TS 23.216 V12.0.0 (Dec. 2013); 3rd Generation Partnership Project; Technical Specification Group Services and System Aspects; Single Radio Voice Call Continuity (SRVCC); Stage 2 (Release 12); 69 pages.
3GPP TS 23.272 V12.1.0 (Dec. 2013); 3rd Generation Partnership Project; Technical Specification Group Services and System Aspects; Circuit Switched (CS) fallback in Evolved Packet System (EPS); Stage 2 (Release 12); 100 pages.
3GPP TS 24.229 V12.2.0 (Sep. 2013); 3rd Generation Partnership Project; Technical Specification Group Core Network and Terminals; IP multimedia call control protocol based on Session Initiation Protocol (SIP) and Session Description Protocol (SDP); Stage 3 (Release 12)—relevant section Chapter 5.1.6; 805 pages.
3GPP TS 26.226 V11.0.0 (Sep. 2012); 3rd Generation Partnership Project; Technical Specification Group Services and System Aspects; Cellular text telephone modem; General description (Release 11); 23 pages.
RFC 4103; G. Hellstrom, et al.; RTP Payload for Text Conversation; Network Working Group; 20 pages.

\* cited by examiner

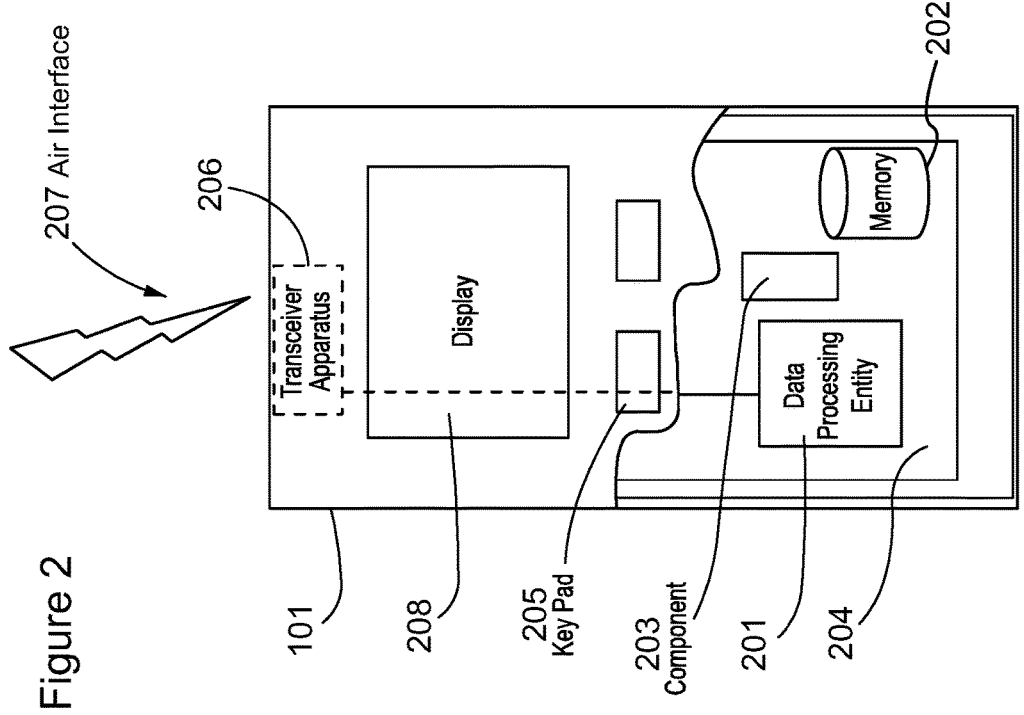

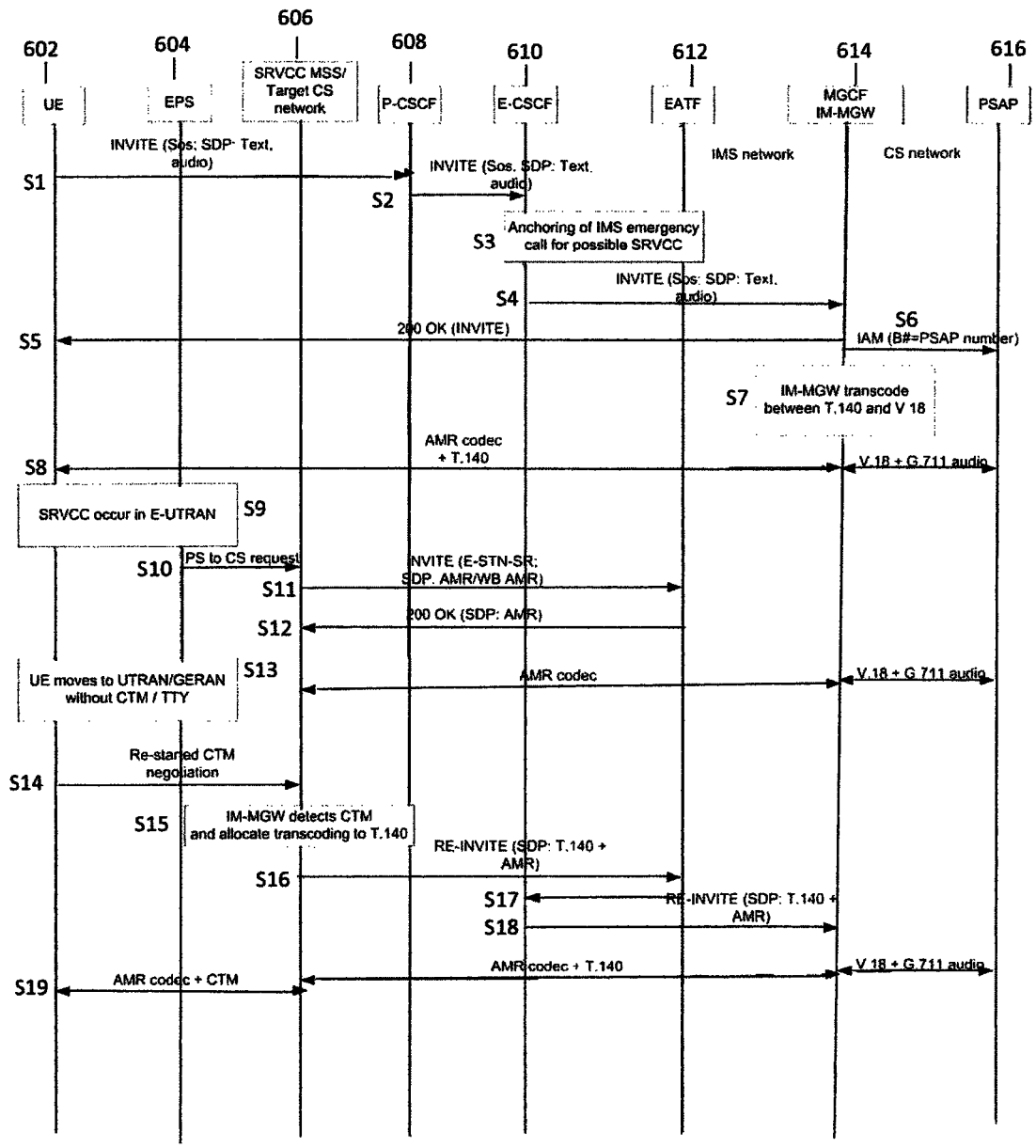

METHOD, APPARATUS AND COMPUTER PROGRAM FOR CONTROL OF A TEXT COMPONENT OF A CALL

The invention relates to a method, apparatus and computer program, and in particular but not exclusively to a method, apparatus and computer program for control of a text component of a call.

BACKGROUND

A communication system can be seen as a facility that enables communication sessions between two or more entities such as fixed or mobile communication devices, base stations, servers and/or other communication nodes. A communication system and compatible communicating entities typically operate in accordance with a given standard or specification which sets out what the various entities associated with the system are permitted to do and how that should be achieved. For example, the standards, specifications and related protocols can define the manner how communication devices can access the communication system and how various aspects of communication shall be implemented between communicating devices. A communication can be carried on wired or wireless carriers. In a wireless communication system at least a part of the communication between at least two stations occurs over a wireless link.

Examples of wireless systems include public land mobile networks (PLMN) such as cellular networks, satellite based communication systems and different wireless local networks, for example wireless local area networks (WLAN). A wireless system can be divided into cells, and hence these are often referred to as cellular systems. A cell is provided by a base station. Cells can have different shapes and sizes. A cell can also be divided into sectors. Regardless of the shape and size of the cell providing access for a user equipment, and whether the access is provided via a sector of a cell or a cell, such area can be called radio service area or access area. Neighbouring radio service areas typically overlap, and thus a communication in an area can listen to more than one base station.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station of an access network and/or another user equipment. The communication device may access a carrier provided by a station, for example a base station, and transmit and/or receive communications on the carrier.

Examples of communication systems attempting to satisfy the increased demands for capacity are architectures that are being standardized by the 3rd Generation Partnership Project (3GPP), such as the long-term evolution (LTE), or the Universal Mobile Telecommunications System (UMTS) radio-access technologies. The LTE aims to achieve various improvements, for example reduced latency, higher user data rates, improved system capacity and coverage, reduced cost for the operator and so on. A further development of the LTE is often referred to as LTE-Advanced. The various development stages of the 3GPP LTE specifications are referred to as releases.

In LTE-Advanced the network nodes can be wide area network nodes such as a macro eNodeB (eNB) which may, for example, provide coverage for an entire cell. Alternatively in LTE-Advanced, network nodes can be small area network nodes such as Home eNBs (HeNB) (femto cells) or pico eNodeBs (pico-eNB). HeNBs may be configured to support local offload and may support any UE or UEs belonging to a closed subscriber group (CSG) or an open subscriber group (OSG). Pico eNBs can, for example, be configured to extend the range of a cell. In some instances a combination of wide area network nodes and small area network nodes can be deployed using the same frequency carriers (e.g. co-channel deployment). In UMTS multiple base stations (Node-Bs) may be controlled by one or more radio network controllers (RNCs).

Real-time text telephony services may be provided in cellular networks, whereby text can be transmitted as it is being typed or otherwise created (e.g. transcribed from a voice call). Global text telephony (GTT), or teletypewriter (TTY) in public switched telephone network (PSTN), is a real-time text service for deaf and/or hearing impaired persons. In Global System for Mobile communications (GSM) an audio codec, cellular text telephony modem (CTM), is used to transmit the text along a circuit switched (CS) speech call. ITU-T T.140, by the International Telegraph Union Telecommunication Standardisation Sector, defines a protocol for real-time text applications. IETF RFC 4103 defines how T.140 is carried over Real-time Transport Protocol (RTP)/User Datagram Protocol (UDP) in IP networks. IETF RFC 4103 is used for GTT services in Session Initiation Protocol (SIP)/IP Multimedia Subsystems (IMS).

Statement

In a first aspect there is provided a method comprising: sending a message to a node for establishment of a call in an area, said area providing at least partially overlapping packet switched and circuit switched coverage; said message comprising a request for one of a packet switched real-time text component and a circuit switched real-time text component in said call; and in response to receiving a message from said node, sending a further message to said node comprising a request to provide the other of a packet switched real-time text component and a circuit switched real-time text component in said call.

Preferably said message received from said node comprises information that said one of a packet switched real-time text component and a circuit switched real-time text component cannot be supported in said call.

Preferably said method is carried out by a user equipment.

Preferably said message sent to said node comprises a session description protocol message.

Preferably said node comprises a call state control function.

Preferably said packet switched real-time text component comprises a T.140 component and said circuit switched real-time text component comprises a cellular text telephony modem component.

Preferably said call comprises an emergency call.

In a second aspect there is provided a method comprising: receiving a message from a user equipment for establishment of a call in an area, said area providing at least partially overlapping packet switched and circuit switched coverage; said message comprising a request for one of a packet switched real-time text component and a circuit switched real-time text component in said call; and determining whether said one of a packet switched real-time text component and a circuit switched real-time text component can be supported in said call.

Preferably said method comprises sending a message to said user equipment comprising information that said one of a packet switched real-time text component and a circuit switched real-time text component cannot be supported in said call.

Preferably said method comprises receiving a further message from said user equipment comprising a request to provide the other of a packet switched real-time text component and a circuit switched real-time text component in said call.

Preferably said packet switched real-time text component comprises a T.140 component and said circuit switched real-time text component comprises a cellular text telephony modem component.

Preferably said call comprises an emergency call.

In a third aspect there is provided a method comprising: determining loss of a first real-time text component in a call during or after handover of said call from a first connection to a second connection, said first connection comprising one of a packet switched connection and a circuit switched connection, and the second connection comprising the other of a packet switched connection and a circuit switched connection; and in response to said determining, initiating use of a second real-time text component for said call, said second real-time text component being a different type of real-time text component to said first real-time text component.

Preferably said type of real-time text component comprises one of a T.140 component and a cellular text modem component.

Preferably said initiating use of a second real-time text component comprises sending a request to a node.

Preferably said method is carried out in a user equipment.

Preferably said node comprises a call state control function.

In a fourth aspect there is provided a method comprising: receiving a request for support of a second real-time text component of a call during or after handover of said call from a first connection to a second connection, following loss of a first real-time text component in said call, said first connection comprising one of a packet switched connection and a circuit switched connection, and the second connection comprising the other of a packet switched connection and a circuit switched connection; and in response to said request, reserving resources for transcoding of said second real-time text component to said first real-time text component.

Preferably said first real-time text component comprises one of a T.140 component and a cellular text telephony modem component; and said second real-time text component comprises the other of a T.140 component and a cellular text telephony modem component.

Preferably said request is received from a user equipment.

Preferably said method is carried out in a node comprising single radio voice call continuity functionality.

In a fifth aspect there is provided a computer program comprising computer executable instructions which when run on one or more processors perform the method of any of the preceding aspects.

In a sixth aspect there is provided an apparatus comprising at least one processor; and at least one memory including computer program code; the at least one memory and the computer program code configured to, with the at least one processor, cause the apparatus at least to: send a message to a node for establishment of a call in an area, said area providing at least partially overlapping packet switched and circuit switched coverage, and said message comprising a request for one of a packet switched real-time text component and a circuit switched real-time text component in said call; and in response to receiving a message from said node, send a further message to said node comprising a request to provide the other of a packet switched real-time text component and a circuit switched real-time text component in said call.

Preferably said message received from said node comprises information that said one of a packet switched real-time text component and a circuit switched real-time text component cannot be supported in said call.

Preferably said apparatus comprises a user equipment.

Preferably said message sent to said node comprises a session description protocol message.

Preferably said node comprises a call state control function.

Preferably said packet switched real-time text component comprises a T.140 component and said circuit switched real-time text component comprises a cellular text telephony modem component.

Preferably said call comprises an emergency call.

In a seventh aspect there is provided an apparatus comprising means for sending a message to a node for establishment of a call in an area, said area providing at least partially overlapping packet switched and circuit switched coverage, and said message comprising a request for one of a packet switched real-time text component and a circuit switched real-time text component in said call; and in response to receiving a message from said node, means for sending a further message to said node comprising a request to provide the other of a packet switched real-time text component and a circuit switched real-time text component in said call.

Preferably said message received from said node comprises information that said one of a packet switched real-time text component and a circuit switched real-time text component cannot be supported in said call.

Preferably said apparatus comprises a user equipment.

Preferably said message sent to said node comprises a session description protocol message.

Preferably said node comprises a call state control function.

Preferably said packet switched real-time text component comprises a T.140 component and said circuit switched real-time text component comprises a cellular text telephony modem component.

Preferably said call comprises an emergency call.

In an eighth aspect there is provided an apparatus comprising at least one processor; and at least one memory including computer program code; the at least one memory and the computer program code configured to, with the at least one processor, cause the apparatus at least to: receive a message from a user equipment for establishment of a call in an area, said area providing at least partially overlapping packet switched and circuit switched coverage; said message comprising a request for one of a packet switched real-time text component and a circuit switched real-time text component in said call; and determine whether said one of a packet switched real-time text component and a circuit switched real-time text component can be supported in said call.

Preferably said apparatus is configured to send a message to said user equipment comprising information that said one of a packet switched real-time text component and a circuit switched real-time text component cannot be supported in said call.

Preferably said apparatus is configured to receive a further message from said user equipment comprising a request to provide the other of a packet switched real-time text component and a circuit switched real-time text component in said call.

Preferably said packet switched real-time text component comprises a T.140 component and said circuit switched real-time text component comprises a cellular text telephony modem component.

Preferably said call comprises an emergency call.

In a ninth aspect there is provided an apparatus comprising means for receiving a message from a user equipment for establishment of a call in an area, said area providing at least partially overlapping packet switched and circuit switched coverage; said message comprising a request for one of a packet switched real-time text component and a circuit switched real-time text component in said call; and means for determining whether said one of a packet switched real-time text component and a circuit switched real-time text component can be supported in said call.

Preferably said apparatus comprises means for sending a message to said user equipment comprising information that said one of a packet switched real-time text component and a circuit switched real-time text component cannot be supported in said call.

Preferably said apparatus comprises means for receiving a further message from said user equipment comprising a request to provide the other of a packet switched real-time text component and a circuit switched real-time text component in said call.

Preferably said packet switched real-time text component comprises a T.140 component and said circuit switched real-time text component comprises a cellular text telephony modem component.

Preferably said call comprises an emergency call.

In a tenth aspect there is provided an apparatus comprising at least one processor; and at least one memory including computer program code; the at least one memory and the computer program code configured to, with the at least one processor, cause the apparatus at least to: determine loss of a first real-time text component in a call during or after handover of said call from a first connection to a second connection, said first connection comprising one of a packet switched connection and a circuit switched connection, and the second connection comprising the other of a packet switched connection and a circuit switched connection; and in response to said determining, initiate use of a second real-time text component for said call, said second real-time text component being a different type of real-time text component to said first real-time text component.

Preferably said type of real-time text component comprises one of a T.140 component and a cellular text modem component.

Preferably said apparatus is configured to send a request to a node to initiate said use of a second real-time text component.

Preferably said apparatus comprises a user equipment.

Preferably said node comprises a call state control function.

In an eleventh aspect there is provided an apparatus comprising means for determining loss of a first real-time text component in a call during or after handover of said call from a first connection to a second connection, said first connection comprising one of a packet switched connection and a circuit switched connection, and the second connection comprising the other of a packet switched connection and a circuit switched connection; and in response to said determining, means for initiating use of a second real-time text component for said call, said second real-time text component being a different type of real-time text component to said first real-time text component.

Preferably said type of real-time text component comprises one of a T.140 component and a cellular text modem component.

Preferably said apparatus comprises means for sending a request to a node to initiate said use of a second real-time text component.

Preferably said apparatus comprises a user equipment.

Preferably said node comprises a call state control function.

In a twelfth aspect there is provided an apparatus comprising at least one processor; and at least one memory including computer program code; the at least one memory and the computer program code configured to, with the at least one processor, cause the apparatus at least to: receive a request for support of a second real-time text component of a call during or after handover of said call from a first connection to a second connection, following loss of a first real-time text component in said call, said first connection comprising one of a packet switched connection and a circuit switched connection, and the second connection comprising the other of a packet switched connection and a circuit switched connection; and reserve resources for transcoding of said second real-time text component to said first real-time text component, in response to said request.

Preferably said first real-time text component comprises one of a T.140 component and a cellular text telephony modem component; and said second real-time text component comprises the other of a T.140 component and a cellular text telephony modem component.

Preferably said apparatus is configured to receive said request from a user equipment.

Preferably said apparatus is configured to provide single radio voice call continuity functionality.

In a thirteenth aspect there is provided an apparatus comprising means for receiving a request for support of a second real-time text component of a call during or after handover of said call from a first connection to a second connection, following loss of a first real-time text component in said call, said first connection comprising one of a packet switched connection and a circuit switched connection, and the second connection comprising the other of a packet switched connection and a circuit switched connection; and means for reserving resources for transcoding of said second real-time text component to said first real-time text component, in response to said request.

Preferably said first real-time text component comprises one of a T.140 component and a cellular text telephony modem component; and said second real-time text component comprises the other of a T.140 component and a cellular text telephony modem component.

Preferably said apparatus comprises means for receiving said request from a user equipment.

Preferably said apparatus comprises means for providing single radio voice call continuity functionality.

BRIEF DESCRIPTION OF DRAWINGS

Some embodiments will now be described by way of example only with reference to the following Figures in which:

FIG. 2 shows a schematic diagram of a communication device according to some embodiments;

FIG. 3 shows a schematic diagram of a control apparatus according to some embodiments;

FIG. 6 is a signalling diagram according to an embodiment.

DESCRIPTION OF SOME EMBODIMENTS

In the following certain exemplifying embodiments are explained with reference to a wireless or mobile communication system serving communication devices. Before explaining in detail the exemplifying embodiments, certain general principles of a wireless communication system, access systems thereof, and communication devices are briefly explained with reference to FIGS. 1 to 3 to assist in understanding the technology underlying the described examples.

Figure 1:
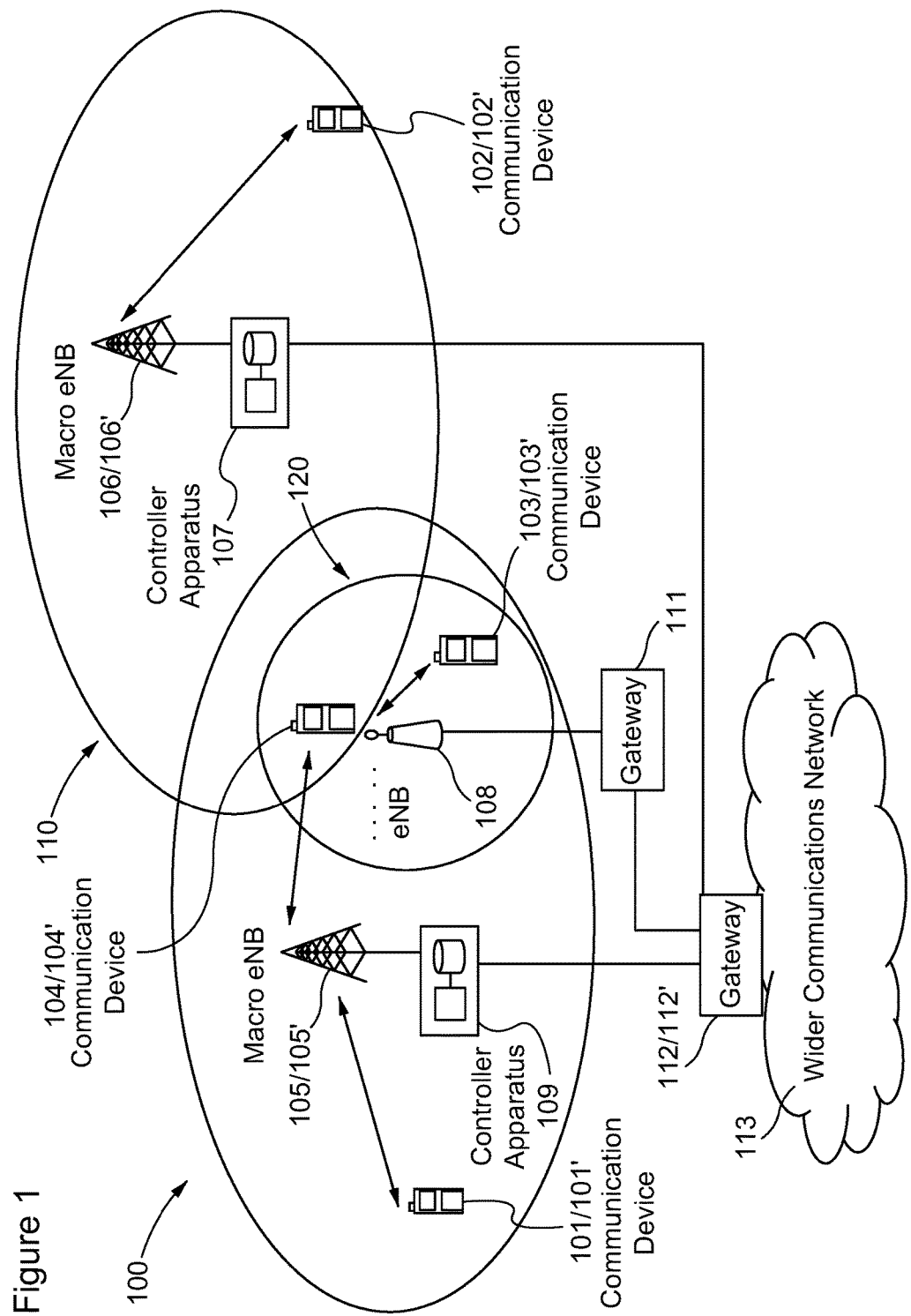
FIG. 1 shows a schematic diagram of a network according to some embodiments.

A communication device or user equipment 101, 102, 103, 104 is typically provided wireless access via at least one base station or similar wireless transmitter and/or receiver node of an access system. In FIG. 1 three neighbouring and overlapping access systems or radio service areas 100, 110 and 120 are shown being provided by base stations 105, 106, and 108.

However, it is noted that instead of three access systems, any number of access systems can be provided in a communication system. An access system can be provided by a cell of a cellular system or another system enabling a communication device to access a communication system. A base station site 105, 106, 108 can provide one or more cells. A base station can also provide a plurality of sectors, for example three radio sectors, each sector providing a cell or a subarea of a cell. All sectors within a cell can be served by the same base station. A radio link within a sector can be identified by a single logical identification belonging to that sector. Thus a base station can provide one or more radio service areas. Each communication device 101, 102, 103, 104, and base station 105, 106, and 108 may have one or more radio channels open at the same time and may send signals to and/or receive signals from more than one source.

Base stations 105, 106, 108 are typically controlled by at least one appropriate controller apparatus 109, 107 so as to enable operation thereof and management of communication devices 101, 102, 103, 104 in communication with the base stations 105, 106, 108. The control apparatus 107, 109 can be interconnected with other control entities. The control apparatus 109 can typically be provided with memory capacity 301 and at least one data processor 302. The control apparatus 109 and functions may be distributed between a plurality of control units. Although not shown in FIG. 1, in some embodiments each base station 105, 106 and 108 can comprise a control apparatus 109, 107.

The cell borders or edges are schematically shown for illustration purposes only in FIG. 1. It shall be understood that the sizes and shapes of the cells or other radio service areas may vary considerably from the similarly sized omnidirectional shapes of FIG. 1.

In particular, FIG. 1 depicts two wide area base stations 105, 106, which can be macro-eNBs 105, 106 in an LTE system. The macro-eNBs 105, 106 transmit and receive data over the entire coverage of the cells 100 and 110 respectively. FIG. 1 also shows a smaller area base station or access point which in some embodiments can be a pico, a femto or Home eNB 108. The coverage of the smaller area base station 108 is generally smaller than the coverage of the wide area base stations 105, 106. The coverage provided by the smaller area node 108 overlaps with the coverage provided by the macro-eNBs 105, 106. Pico eNBs can be used to extend coverage of the macro-eNBs 105, 106 outside the original cell coverage 100, 110 of the macro-eNBs 105, 106. The pico eNB can also be used to provide cell coverage in "gaps" or "shadows" where there is no coverage within the existing cells 100, 110 and/or may serve "hot spots". In some embodiments, the smaller area node can be a femto or Home eNB which can provide coverage for a relatively small area such as the home. Some environments may have both pico and femto cells.

As shown, the radio service areas can overlap. Thus signals transmitted in an area can interfere with communications in another area (macro to macro, pico/femto to either one or both of the macro cells, and/or pico/femto to pico/femto).

The communication devices 101, 102, 103, 104 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

Some non-limiting examples of the recent developments in communication systems are the long-term evolution (LTE) of the Universal Mobile Telecommunications System (UMTS) that is being standardized by the 3rd Generation Partnership Project (3GPP). As explained above, further development of the LTE is referred to as LTE-Advanced. Non-limiting examples of appropriate access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access systems include those provided by base stations of systems that are based on technologies such as wireless local area network (WLAN) and/or WiMax (Worldwide Interoperability for Microwave Access).

In FIG. 1 the base stations 105, 106, 108 of the access systems can be connected to a wider communications network 113. A controller apparatus 107, 109 may be provided for coordinating the operation of the access systems. A gateway function 112 may also be provided to connect to another network via the network 113. The smaller area base station 108 can also be connected to the other network by a separate gateway function 111. The base stations 105, 106, 108 can be connected to each other by a communication link for sending and receiving data. The communication link can be any suitable means for sending and receiving data between the base stations 105, 106 and 108 and in some embodiments the communication link is an X2 link.

The other network may be any appropriate network. A wider communication system may thus be provided by one or more interconnect networks and the elements thereof, and one or more gateways may be provided for interconnecting various networks.

It will be appreciated that embodiments may also be applicable to a UMTS network. In a UMTS network user equipment 101', 102', 103' and 104' may be in communication with NodeBs 105' and 106'. The Node Bs 105' and 106' may themselves be controlled by an RNC 112'

The communication devices will now be described in more detail with reference to FIG. 2. FIG. 2 shows a schematic, partially sectioned view of a communication device 101 that a user can use for communication. Of course the other communication devices shown in FIG. 1 may have the same or similar features. Such a communication device is often referred to as user equipment (UE) or terminal. An appropriate communication device may be provided by any device capable of sending and receiving radio signals. The communication device may be mobile or may be generally stationary. Non-limiting examples include a mobile station (MS) such as a mobile phone or what is known as a 'smart phone', a portable computer provided with a wireless interface card or other wireless interface facility, personal data assistant (PDA) provided with wireless communication capabilities, a computer or any combinations of these or the like.

A communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The device 101 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the communication device.

The communication device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the communication device by means of a suitable user interface such as key pad 205, voice commands, touch sensitive screen or pad, combinations thereof or the like. A display 208, a speaker and a microphone can be also provided. Furthermore, a communication device may comprise appropriate connectors (either wired or wireless) to other devices and/or for connecting external accessories, for example hands-free equipment, thereto.

FIG. 3 shows an example of a control apparatus 109 for a communication system, for example to be coupled to and/or for controlling a station of an access system. In some embodiments the base stations 105, 106, and 108 comprise a control apparatus 109. In some embodiments, each base station will have a control apparatus. In other embodiments the control apparatus can be another network element. The control apparatus 109 can be arranged to provide control of communications by communication devices that are in the service area of the system. The control apparatus 109 can be configured to provide control functions in association with generation and communication of transmission patterns and other related information by means of the data processing facility in accordance with certain embodiments described below. For this purpose the control apparatus 109 comprises at least one memory 301, at least one data processing unit 302, 303 and an input/output interface 304. Via the interface the control apparatus can be coupled to a receiver and a transmitter of the base station. The control apparatus 109 can be configured to execute an appropriate software code to provide the control functions.

3GPP has standardized emergency call support for IMS in stage 2 level in 3GPP TS 23.167 and at stage 3 level in 3GPP TS 24.229. This capability is expected to be required for all Voice over LTE (VoLTE) deployments eventually.

Circuit-switched (CS) fallback for EPS (CSFB) procedures are used today in some 3GPP based networks in order to support voice services and short message services prior to the introduction of VoLTE. 3GPP has standardized CSFB in stage 2 level in 3GPP TS 23.272. CSFB supports the capability to perform emergency calls via CS access.

VoLTE capable UEs in many markets may have in parallel support for CSFB. In this respect CSFB may be used to complement some missing functionalities from early VoLTE deployment such as roaming, emergency calls, as well as short message services to name a few. Also, terminals having support for VoLTE may be expected to support CSFB procedures and CS radio access technologies.

Text Telephony (TTY) methods are standardized in ITU-T as part of V.18 (V.18: Operational and interworking requirements for modems operating in the text telephone mode) in order to enable hearing impaired subscribers to establish voice calls, but instead of using voice, they can use text communication which is carried as part of the voice channel as an encoded signal. V.18 is used in today's PSTN networks.

In at least some mobile network (GSM/3G) markets similar requirements exist to support text telephony. Due to the different nature of mobile technologies use of V.18 over the air interface has been considered to be problematical and alternative technology was developed by 3GPP. It is known as Cellular Text telephony Modem (CTM) and defined as part of Global Text Telephony (GTT). When a terminal having attached TTY equipment/capability establishes a voice call it informs the network of the requirement for CTM support. CTM related functionality may reside in transcoding equipment since the actual text communication is embedded within speech frames that are interpreted by the transcoding equipment. Transcoding can be performed either at the base station or in the core network depending on the network architecture.

Transcoding in this context may be considered as conversion between CTM and V.18. The V.18 may be used inside the core network and the CTM may be used in the radio access network.

In 3GPP IMS architecture the use of CTM is not standardized. Instead, another protocol known as T.140 (real time text telephony) has been mandated. In a case where an IMS subscriber calls a PSTN subscriber using TTY then there is a need to also perform conversion between T.140 and V.18 within IMS. This may be performed in IM-MGW (see 3GPP TS 29.163) under control of the Media Gateway Control Function (MGCF).

TTY may, in at least some regions, also be a requirement for IMS emergency calls that are established by VoLTE subscribers.

Single Radio Voice Call Continuity (SRVCC) makes it possible to continue established voice calls even in a case where LTE coverage is no longer available and the call was originally established as a VoIP call in the IMS domain. The network, together with the terminal, and by using procedures as defined in 3GPP TS 23.216, may perform access domain transfer from LTE (IMS) to CS domain. 3GPP Release 9 further enhanced SR-VCC procedures to support IMS emergency calls also. That is SRVCC allows for handover between a packet-switched call in LTE and a circuit-switched call in a legacy system, such as WCDMA.

In a case where a VoLTE UE is capable of using Text Telephony in the context of an IMS call (which may be an emergency call), but the LTE coverage provided by the network is not sufficient in all areas within the network, the VoLTE UE may require use of SR-VCC to enable the call to be continued when the LTE coverage is no longer available.

The current 3GPP specifications do not specify interworking between SRVCC and Text Telephony based on the T.140 protocol. Thus it may not be possible in practise to use IMS emergency call with T.140 in a case where SRVCC is needed in the network deployment, and the T.140 component may be removed from an ongoing emergency call after the SRVCC has occurred. This can be appreciated from FIG. 4.

Figure 4:
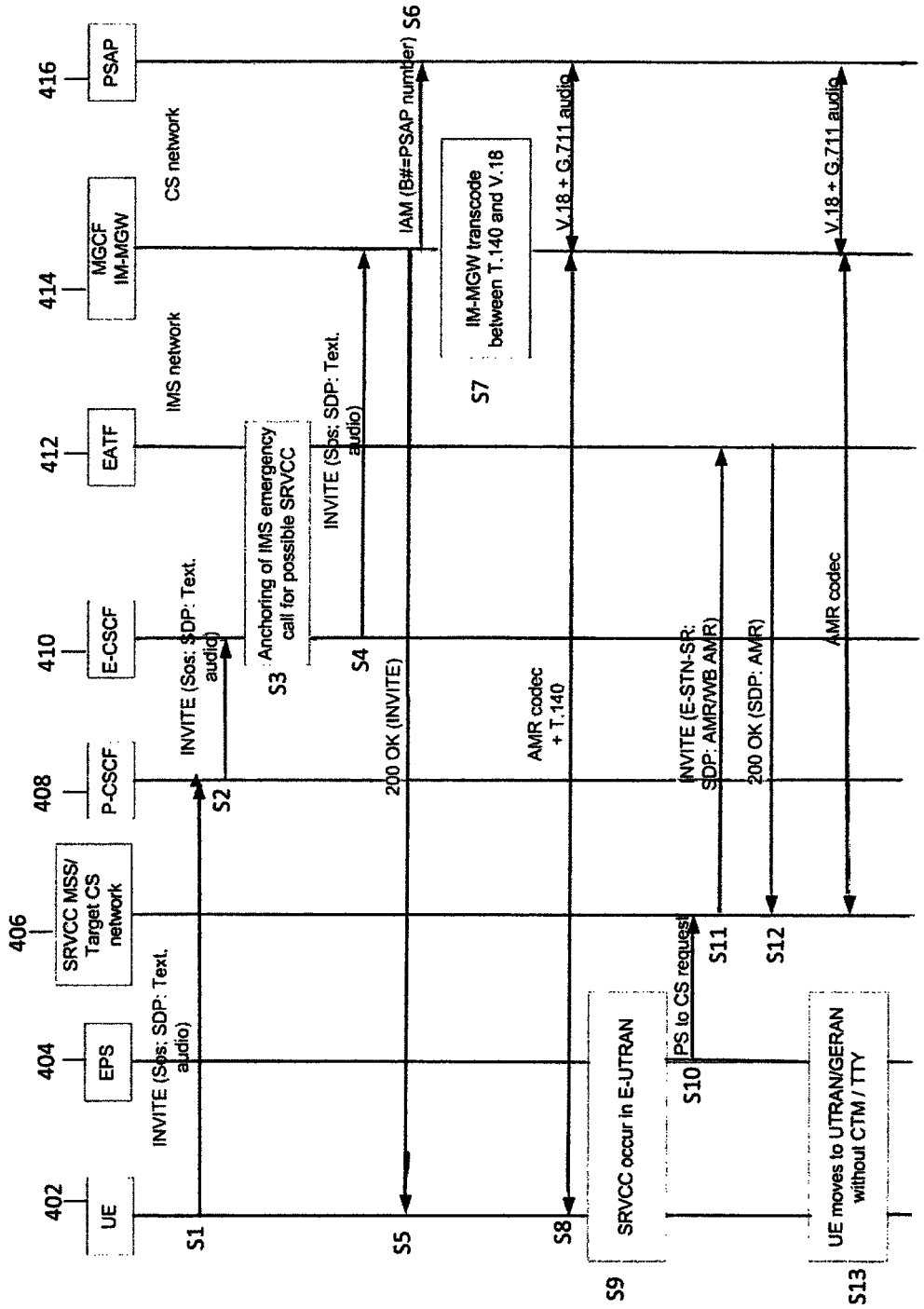
FIG. 4 is a signalling diagram according to a current deployment.

FIG. 4 shows signalling between a UE 402, an evolved packet system (EPS) server 404, a single radio voice call continuity mobile switching centre server (SRVCC-MSS) 406, a proxy call state control function (P-CSCF) 408, an emergency call state control function (E-CSCF) 410, an emergency access transfer function (EATF) 412, a media gateway control function 414, and a public safety answering point (PSAP) 416. Communications between the EATF 412 and the MGCF 414 occur over the IMS network i.e. are packet switched. Communications between the MGCF 414 and the PSAP 416 are circuit switched.

In this example, at step S1 the UE 402 sends an INVITE message to the P-CSCF 408. This INVITE message comprises SOS, SDP, text, and audio components. The "SOS" component indicates that this is an emergency call. Accordingly, at step S2 the INVITE message is forwarded to the E-CSCF 410. At this point the emergency call is anchored with the EATF 412 in the IMS network (step S3). Information regarding the anchoring may be visible in Via and Record Route headers. The Emergency SRVCC may be initiated by EPS based on a dedicated emergency bearer. At step S4 the E-CSCF 410 forwards the INVITE message to the MGCF 414.

Upon receipt of the INVITE message, at step S5 the MGCF 414 responds with a SIP message 200OK (INVITE) message to the UE (after an Answer Message (ANM) is received from PSAP). Also, at step S6 the MGCF 414 sends an IAM (B#=PSAP number) message to the PSAP 416 then, with the connections in place, at step S7 the MGCF 414 (and more particularly the IM-MGW) can begin to transcode between T.140 text component (as used in the IMS network) and the V.18 component which is suitable for the PSAP 416 in the circuit switched network. This is shown at step S8 where the UE 402 is shown communicating with the MGCF 414 using the AMR (adaptive multi-rate) codec and the T.140 component, whereas the MGCF 414 communicates with the PSAP 460 using the V.18 protocol and G.711 audio.

At step S9 the SRVCC occurs in E-UTRAN. As part of this, the UE sends measurement reports to the eNodeB, where detections are carried out and the eNodeB requests the PS to CS handover from MME. The MME can determine that it is an emergency based on the dedicated bearer.

In response to this, at step S10 a request to move from a packet switched connection to a circuit switched connection is sent from the EPS 404 to the SRVCC-MSS 406. At step S11 an INVITE is sent from the SRVCC-MSS 406 to the EATF 412. The EATF can then renegotiate the media towards the MGCF:Re:INVITE. In response to this, and at step S12, the EATF 412 sends a 200 OK message to the SRVCC-MSS.

Then, as shown at step S13 the UE moves from the E-UTRAN to the UTRAN, without the CTM/TTY. The SRVCC-MSS 406 continues to communicate with the MGCF 414 using the AMR codec, and the connection (V.18 and G.711 audio) between the MGCF 414 and the PSAP 416 continues. However, there is no means for carrying over the real-time text component of the emergency call after the UE has moved to the circuit switched network. That is the real-time text component has been dropped. This may be problematic, in particular in the context of an emergency call. Furthermore, due to the lack of a real-time text component, the V.18 connection may be torn down.

The 3GPP IMS emergency call procedures as defined in 3GPP TS 24.229 Chapter 5.1.6 (version 12.2), describe a mechanism that can be used by the serving P-CSCF to inform the UE performing an emergency call procedure with IMS to use the circuit switched domain instead. See 3GPP TS 24.229, Chapter 5.1.6.8.3.

When a UE in an IMS domain establishes an emergency call which comprises a text telephony component (T.140) inside the call, then it may indicate this requirement by including T.140 in the SDP offer, as defined in IETF RFC 4103. An example SDP offer is shown below:

m=text 11 000 RTP/AVP 98
a=rtpmap: 98 t.140/1000

This SDP offer may also include the normal audio codec e.g. wideband adaptive multirate (WB AMR) or narrowband AMR. When the P-CSCF receives the SDP offer containing the T.140 component then, instead of invoking the E-CSCF, it shall instead reply to the calling UE with a 380 SIP response with a standardised XML payload e.g. "application/3gpp-ims+ xml" containing <type> element encoded as "emergency", and may also contain an <alternative service> element as well. This information instructs or causes the UE to retry the call via circuit switched access instead of continuing with the packet switched attempt. It will of course be understood that the particular content described within the messages (e.g. "<alternative service>" is described by way of example only, and that providing the information to the user equipment in other forms so as to cause it to retry the call via the circuit switched access may also be used.

After receiving this response from the network, the VoLTE UE will then re-attempt the emergency call via the circuit switched routes.

It will be appreciated that this embodiment is of particular use where packet switched (e.g. LTE) and circuit switched coverage at least partially overlap.

Figure 5:
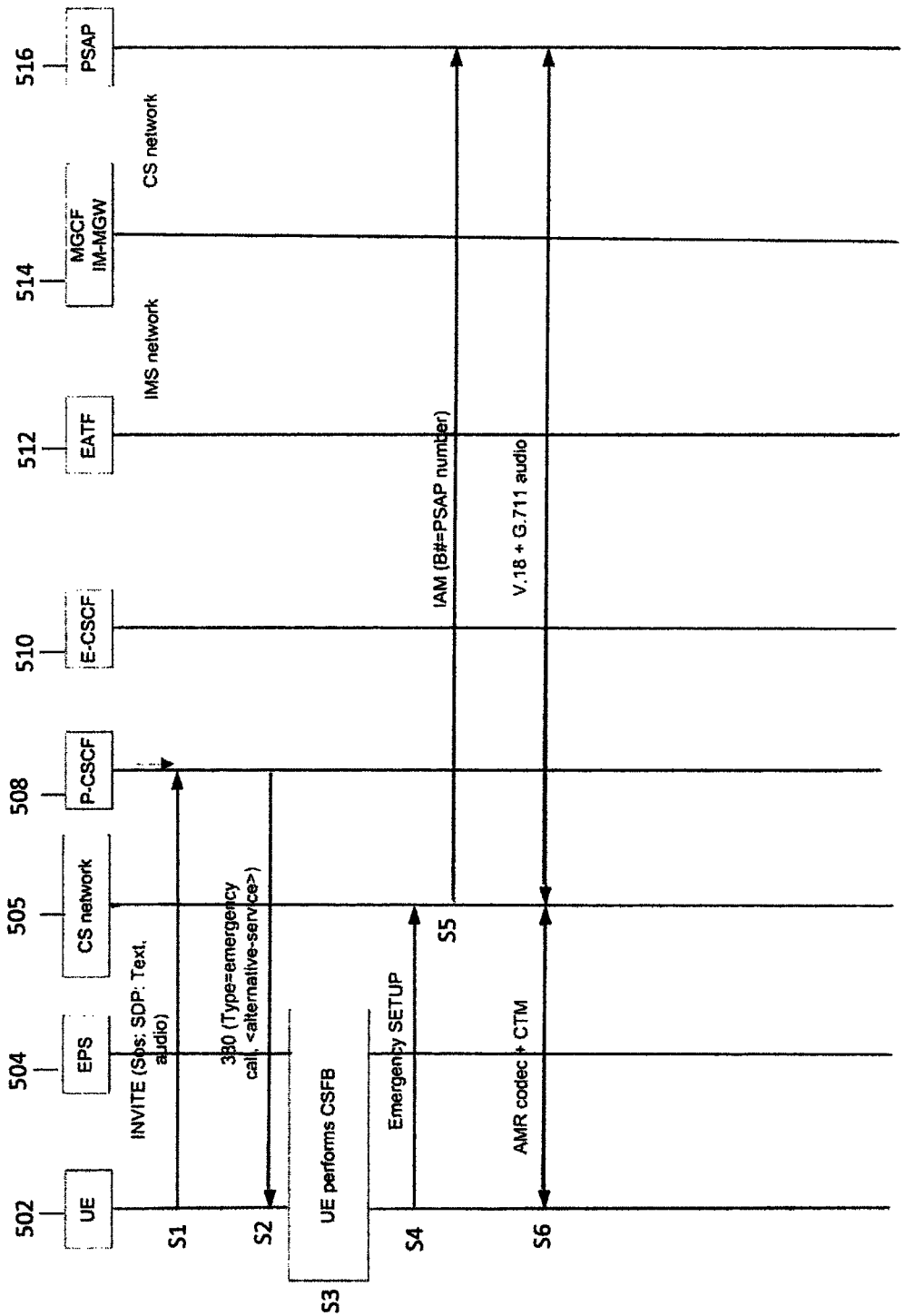
FIG. 5 is a signalling diagram according to an embodiment.

This embodiment is shown in more detail with respect to FIG. 5, which shows a signalling diagram of messages between a UE 502, an EPS 504, a circuit switched network

505, a P-CSCF 508, an E-CSCF 510, an EATF 512, an MGCF IM-MGW 514, and a PSAP 516.

At step S1 the UE sends an INVITE message to the P-CSCF 508. This INVITE message comprises an SOS, an SDP: text, and an audio component. In response to determining that this is an emergency call, the P-CSCF 508 responds to the UE 502 with a 380 (Type=emergency call, <alternative service>) message. This is shown at step S2.

The <alternative service> message informs the UE that the call (in particular the text components) cannot be supported in the packet switched domain, and that an "alternative service" such as the circuit switched domain should be used. Accordingly, at step S3 the UE performs CSFB, and at step S4 the emergency setup takes place between the UE 502 and the circuit switched network 505. Therefore, the circuit switched network 505 sends, at step S5 the IAM message to the PSAP 516.

Communication of the call (including the text component) between the UE 502 and the PSAP 516 is shown at step S6. The communications between the UE 502 and the CS network 505 use the AMR codec and CTM, whilst the communications between the CS network 505 and the PSAP 516 use the V.18 protocol and G.711 audio.

Accordingly, when the P-CSCF detects the presence of T.140 in the IMS emergency call, it orders the calling UE to re-attempt the emergency call via the circuit switched network. The emergency call including the text component can then take place using a circuit switched connection.

In a further embodiment, discussed in further detail below with respect to FIG. 6, the UE re-initiates text telephony communication (as CTM) in parallel to the speech connection after SRVCC has occurred. In this respect, when moving from a packet switched to a circuit switched connection the UE releases the T.140 related resources and instead allocates CTM modem resources. When this SRVCC procedure has occurred, and the T.140 connection has been removed from the end-to-end connection, the caller UE is also made aware of this situation. Once the UE has been made aware of the situation the UE will try to re-establish the text telephony connection after SRVCC has been successfully performed, by starting the CTM negotiation. This CTM negotiation is described in 3GPP TS 26.226 chapter 9 (version 11.0.0). As part of this embodiment the UE may constantly monitor the CTM.

In this embodiment the IMS emergency call is established normally via LTE. When the SRVCC occurs then the UE starts to negotiate use of CTM in the CS radio bearer towards the core network. The IM-MGW reserved for the session transfer call by the SRVCC enhanced MSS will then invoke transcoding between CTM and T.140. The SRVCC enhanced MSS may perform codec modification towards session transfer call and the remote side of the call, in order to add T.140 media stream into the existing session.

This is described in more detail with respect to FIG. 6 which shows a signalling diagram between a UE 602, an EPS 604, an SRVCC-MSS 606, a P-CSCF 608, an E-CSCF 610, an EATF 612, an MGCF IM-MGW 614, and a PSAP 616.

Steps S1 to S13 are the same as steps S1 to S13 described with respect to FIG. 4. That is the IMS emergency call is established normally to the PSAP that resides in the CS network, and the MGCF IM-MGW 614 performs transcoding between T.140 and V.18. At step S9 the SRVCC is invoked by the E-UTRAN for 001=1 EPS bearer. The SRVCC enhanced MSS establishes a Session Transfer call towards E-CSCF/EATF by routing the call with an E-STN-SR (Emergency Session Transfer Number-Single Radio).

After this point, and as described with respect to FIG. 4, the T.140 may no longer be available for the call.

At step S14 the UE restarts CTM negotiation with the SRVCC-MSS 606.

At step S15 the IM-MGW (which in this embodiment is incorporated in the SRVCC-MSS) detects the CTM component, and allocates resources for transcoding the CTM component to the T.140 protocol.

Then at step S16 the SRVCC-MSS sends a RE-INVITE message to the EATF 612. The RE-INVITE message comprises the SDP:T.140 and AMR components. In response to this, at step S17, the EATF 612 responds with another RE-INVITE (SDP: T.140+AMR) message to the E-CSCF. The E-CSCF then forwards this to the MGCF 614 at step S18.

End-to-end communication between the UE 602 and PSAP 616 is then shown at step S19. The UE 602 communicates with the SRVCC-MSS 606 using the AMR codec and the CTM component. The SRVCC-MSS communicates with the MGCF 614 using the AMR codec and the T.140 component, following transcoding of the CTM to T.140 at the SRVCC-MSS. This is then further transcoded at the MGCF 614, such that the text component can be sent to the PSAP 616 using the V.18 protocol and G.711 audio for the speech.

Accordingly it will be understood that the UE 602 is then capable of end-to-end real-time text communication with the PSAP 616.

It will be appreciated that embodiments may enable the continuance of a real time text component of a call when handing over between a packet switched connection and a circuit switched connection. The packet switched connection may be within the same network as the circuit switched connection. Alternatively the packet switched connection may be comprised in a different network to the circuit switched connection. The packet switched connection may be in the same cell as the circuit switched connection. Alternatively the packet switched connection may be in a different cell to the circuit switched connection. That is some embodiments may be applicable to handover between cells and/or networks.

Although the embodiments shown in the Figures describe maintaining the real-time text component when moving from packet switched to circuit switched connections, other embodiments may be equally applicable to the reverse operation i.e. moving from circuit switched to packet switched connections.

Although in the described embodiments the T.140 protocol is described with respect to the packet switched network and the CTM protocol is described with respect to the circuit switched network, it will be appreciated that this is by way of example only and that in other embodiments other protocols may be employed.

Furthermore, although the embodiments are described with respect to an emergency call, it will be appreciated that some embodiments are equally applicable to normal (i.e. non-emergency) calls.

It is also noted herein that while the above describes exemplifying embodiments of the invention, there are several variations and modifications which may be made to the disclosed solution without departing from the scope of the present invention.

The required data processing apparatus and functions of a base station apparatus, a communication device and any other appropriate station may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments may be implemented by computer software executable by a data processor of the communication device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A method comprising:
   determining loss of a first real-time text component in a call during or after handover of said call from a first connection to a second connection, said first connection comprising one of a packet switched connection and a circuit switched connection, and the second connection comprising the other of a packet switched connection and a circuit switched connection; and
   in response to said determining, initiating use of a second real-time text component for said call, said second real-time text component being a different type of real-time text component to said first real-time text component.

2. A method as set forth in claim 1, wherein said type of real-time text component comprises one of a T.140 component and a cellular text modem component.

3. A method as set forth in claim 1, wherein said initiating use of a second real-time text component comprises sending a request to a node.

4. A method as set forth in claim 1, carried out in a user equipment.

5. A method comprising:
   receiving a request for support of a second real-time text component of a call during or after handover of said call from a first connection to a second connection, following loss of a first real-time text component in said call, said first connection comprising one of a packet switched connection and a circuit switched connection, and the second connection comprising the other of a packet switched connection and a circuit switched connection; and
   in response to said request, reserving resources for transcoding of said second real-time text component to said first real-time text component.

6. A method as set forth in claim 5, wherein said first real-time text component comprises one of a T.140 component and a cellular text telephony modem component; and said second real-time text component comprises the other of a T.140 component and a cellular text telephony modem component.

7. A method as set forth in claim 5, wherein said request is received from a user equipment.

8. An apparatus comprising
   at least one processor;
   and at least one memory including computer program code;
   the at least one memory and the computer program code configured to, with the at least one processor, cause the apparatus at least to:
   determine loss of a first real-time text component in a call during or after handover of said call from a first connection to a second connection, said first connection comprising one of a packet switched connection and a circuit switched connection, and the second connection comprising the other of a packet switched connection and a circuit switched connection; and
   in response to said determining, initiate use of a second real-time text component for said call, said second real-time text component being a different type of real-time text component to said first real-time text component.

9. An apparatus as set forth in claim 8, wherein said type of real-time text component comprises one of a T.140 component and a cellular text modem component.

10. An apparatus as set forth in claim 8, wherein said apparatus is configured to send a request to a node to initiate said use of a second real-time text component.

11. An apparatus as set forth in claim 8, wherein said apparatus comprises a user equipment.

12. An apparatus comprising
at least one processor;
and at least one memory including computer program code;
the at least one memory and the computer program code configured to, with the at least one processor, cause the apparatus at least to:
receive a request for support of a second real-time text component of a call during or after handover of said call from a first connection to a second connection, following loss of a first real-time text component in said call, said first connection comprising one of a packet switched connection and a circuit switched connection, and the second connection comprising the other of a packet switched connection and a circuit switched connection; and
reserve resources for transcoding of said second real-time text component to said first real-time text component, in response to said request.

13. An apparatus as set forth in claim 12, wherein said first real-time text component comprises one of a T.140 component and a cellular text telephony modem component; and said second real-time text component comprises the other of a T.140 component and a cellular text telephony modem component.

14. An apparatus as set forth in claim 12, wherein said apparatus is configured to receive said request from a user equipment.

* * * * *